United States Patent
Choi et al.

(10) Patent No.: US 10,889,702 B2
(45) Date of Patent: *Jan. 12, 2021

(54) REINFORCING MATERIAL FOR RUBBER COMPRISING ALUMINOSILICATE PARTICLES AND RUBBER COMPOSITION FOR TIRES COMPRISING THE SAME

(71) Applicant: LG CHEM, LTD., Seoul (KR)

(72) Inventors: Kwonil Choi, Daejeon (KR); Eunkyu Seong, Daejeon (KR); Hana Lee, Daejeon (KR); Wooseok Kim, Daejeon (KR); Myounghwan Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/497,756

(22) PCT Filed: Jan. 31, 2019

(86) PCT No.: PCT/KR2019/001383
§ 371 (c)(1),
(2) Date: Sep. 25, 2019

(87) PCT Pub. No.: WO2019/164154
PCT Pub. Date: Aug. 29, 2019

(65) Prior Publication Data
US 2020/0024430 A1 Jan. 23, 2020

(30) Foreign Application Priority Data

Feb. 21, 2018 (KR) .................. 10-2018-0020651
Jan. 29, 2019 (KR) .................. 10-2019-0011316

(51) Int. Cl.
| | | |
|---|---|---|
| *C08L 9/02* | (2006.01) | |
| *C08L 7/00* | (2006.01) | |
| *C08L 9/06* | (2006.01) | |
| *B60C 1/00* | (2006.01) | |
| *C08K 3/34* | (2006.01) | |

(52) U.S. Cl.
CPC .................. *C08L 9/02* (2013.01); *B60C 1/00* (2013.01); *C08K 3/34* (2013.01); *C08L 7/00* (2013.01); *C08L 9/06* (2013.01); *C08K 2201/003* (2013.01); *C08K 2201/006* (2013.01)

(58) Field of Classification Search
CPC ...... C08L 9/02; C08L 7/00; C08L 9/06; C08L 21/00; C08K 2201/006; C08K 3/34; C08K 2201/003; B60C 1/00
See application file for complete search history.

(56) References Cited

U.S. PATENT DOCUMENTS

| | | |
|---|---|---|
| 5,580,919 A | 12/1996 | Agostini et al. |
| 5,674,932 A | 10/1997 | Agostini et al. |
| 5,961,943 A | 10/1999 | Komatsu et al. |
| 7,256,233 B2 | 8/2007 | Simonot et al. |
| 2006/0009564 A1 | 1/2006 | Simonot et al. |
| 2006/0148955 A1 | 7/2006 | Guiselin et al. |
| 2017/0137322 A1 | 5/2017 | Seo |
| 2019/0375645 A1 | 12/2019 | Choi et al. |
| 2020/0010329 A1* | 1/2020 | Choi .................. B60C 1/00 |

FOREIGN PATENT DOCUMENTS

| | | | |
|---|---|---|---|
| EP | 3395880 A1 * | 10/2018 | ............... C08K 3/34 |
| EP | 3 401 359 A1 | 11/2018 | |
| EP | 3401359 A1 * | 11/2018 | ............... C08L 9/06 |
| JP | 49-30918 A | 8/1974 | |
| JP | 5-97426 A | 4/1993 | |
| JP | 10-95608 A | 4/1998 | |
| JP | 10-182847 A | 7/1998 | |
| JP | 2000-272917 A | 10/2000 | |
| JP | 2006-510766 A | 3/2006 | |
| JP | 2008-522012 A | 6/2008 | |
| JP | 2013-56791 A | 3/2013 | |
| JP | 2017-065943 A | 4/2017 | |
| JP | 2017-128499 A | 7/2017 | |
| JP | 2020-506147 A | 2/2020 | |
| KR | 10-1996-0034289 A | 10/1996 | |
| KR | 10-2007-0086876 A | 8/2007 | |
| KR | 10-2012-0041399 A | 5/2012 | |
| KR | 10-2017-0020858 A | 2/2017 | |
| KR | 10-2017-0048851 A | 5/2017 | |
| KR | 10-2018-0028927 A | 3/2018 | |
| KR | 10-2018-0126850 A | 11/2018 | |
| WO | 2004/056915 A1 | 7/2004 | |
| WO | 2015/191817 A1 | 12/2015 | |
| WO | 2018/084466 A1 | 5/2018 | |
| WO | 2019/059594 A1 | 3/2019 | |

OTHER PUBLICATIONS

Saalwächter, "Microstructure and Molecular Dynamics of Elastomers as Studied by Advanced Low-Resolution Nuclear Magnetic Resonance Methods", Rubber Chemistry and Technology, vol. 85, No. 3, pp. 350-386 (2012).

* cited by examiner

Primary Examiner — Robert D Harlan
(74) Attorney, Agent, or Firm — Dentons US LLP (57) ABSTRACT

The present disclosure relates to a reinforcing material for rubber including aluminosilicate particles and a rubber composition for tires including the same. The aluminosilicate particles included in the reinforcing material for rubber according to the present disclosure exhibit an enhanced reinforcing effect due to excellent dispersibility in the rubber composition, but do not hinder processability of the rubber composition. Therefore, the aluminosilicate particles can be suitably applied as a reinforcing material in a rubber composition for tires.

6 Claims, 1 Drawing Sheet

REINFORCING MATERIAL FOR RUBBER COMPRISING ALUMINOSILICATE PARTICLES AND RUBBER COMPOSITION FOR TIRES COMPRISING THE SAME

CROSS-REFERENCE TO RELATED APPLICATIONS

This application is the U.S. national phase of international application No. PCT/KR2019/001383 filed on Jan. 31, 2019, and claims the benefits of Korean Patent Application No. 10-2018-0020651 filed on Feb. 21, 2018 and No. 10-2019-0011316 filed on Jan. 29, 2019 with the Korean Intellectual Property Office, the disclosures of which are incorporated herein by reference in their entirety.

FIELD

The present disclosure relates to a reinforcing material for rubber including aluminosilicate particles, and a rubber composition for tires including the same.

BACKGROUND

As concerns about global warming and environmental problems spread, environment-friendly concepts for increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that highly dispersed precipitated silica having specific conditions can be used together with a silane coupling agent to make a material for eco-friendly tires having good abrasion resistance.

In addition, there is also high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

DOCUMENT (Non-Patent Document 1) Kay Saalwachter, Microstructure and molecular dynamics of elastomers as studied by advanced low-resolution nuclear magnetic resonance methods, Rubber Chemistry and Technology, Vol. 85, No. 3, pp. 350-386 (2012).

SUMMARY

The present disclosure is to provide a reinforcing material for rubber capable of imparting an excellent reinforcing effect and processability to tires.

In addition, the present disclosure is to provide a rubber composition for tires including the reinforcing material for rubber.

DETAILED DESCRIPTION

Figure 1:
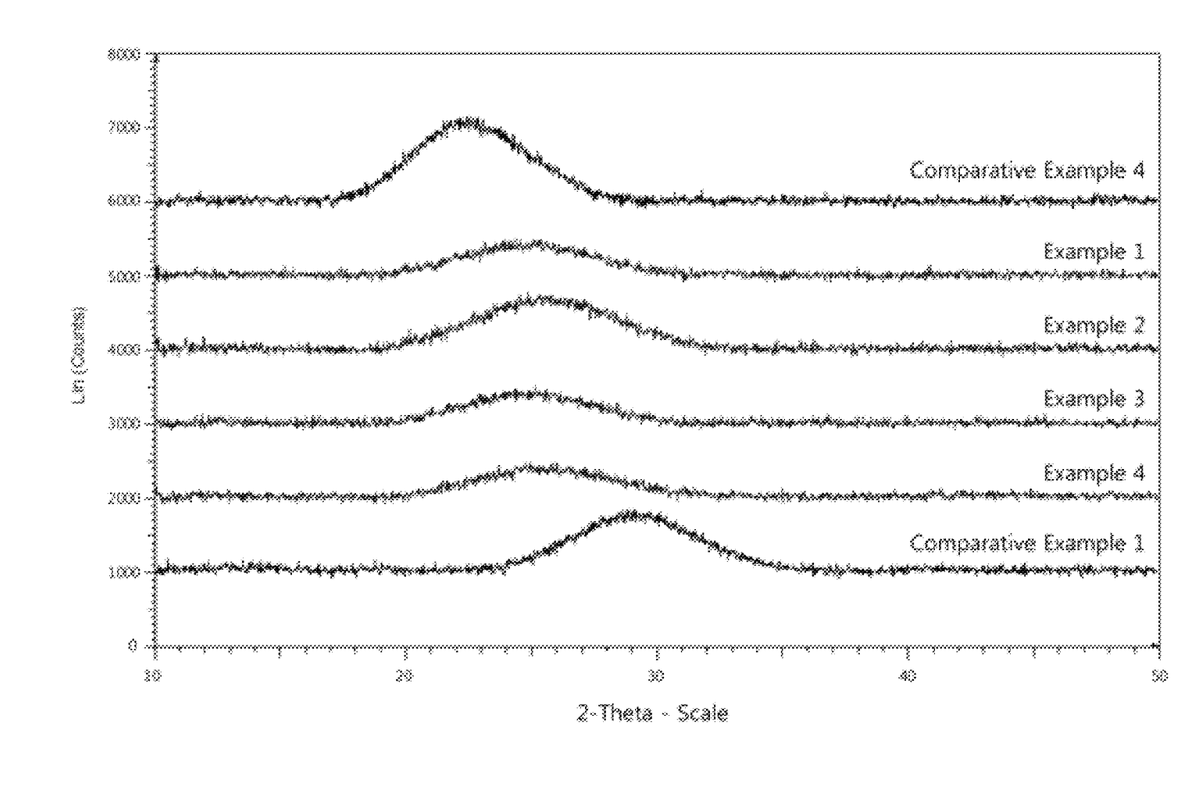
The FIGURE is a graph showing the X-ray diffraction analysis of the aluminosilicate particles according to examples and comparative examples.

According to the present disclosure, a reinforcing material for rubber including amorphous aluminosilicate particles having a composition of the following Chemical Formula 1 is provided, wherein the aluminosilicate particles satisfy the following conditions:

in a data plot obtained by X-ray diffraction (XRD), a full width at half maximum (FWHM) in a 2θ range of 23° to 37° is 5° to 7°, and a maximum peak intensity ($I_{max}$) is in a 2θ range of 23° or more and less than 26°,

[Chemical Formula 1]

in Chemical Formula 1,
M is an element selected from the group consisting of Li, Na, K, Rb, Cs, Be, Fr, Ca, Zn, and Mg, or an ion thereof;
a≥0, x>0, y>0, and m≥0;
a/x<1.2; and
3.0<y/x<20.0.

The present disclosure also provides a rubber composition for tires including the reinforcing material for rubber.

Hereinafter, the reinforcing material for rubber and the rubber composition for tires including the same according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. Reinforcing Material for Rubber

According to an embodiment of the present disclosure, a reinforcing material for rubber including amorphous aluminosilicate particles having a composition of the following Chemical Formula 1 is provided, wherein the aluminosilicate particles satisfy the following conditions:

in a data plot obtained by X-ray diffraction (XRD), a full width at half maximum (FWHM) in a 2θ range of 23° to 37° is 5° to 7°, and a maximum peak intensity ($I_{max}$) is in a 2θ range of 23° or more and less than 26°,

[Chemical Formula 1]

in Chemical Formula 1,
M is an element selected from the group consisting of Li, Na, K, Rb, Cs, Be, Fr, Ca, Zn, and Mg, or an ion thereof;

a≧0, x>0, y>0, and m≧0;
a/x<1.2; and
3.0<y/x<20.0.

As a result of studies by the present inventors, it was confirmed that aluminosilicate particles satisfying the above-mentioned characteristics can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

In addition, the aluminosilicate particles may exhibit excellent mechanical properties (for example, excellent durability, abrasion resistance, compressive strength, etc.) as compared with reinforcing materials not satisfying the above-mentioned characteristics, since the formation of micropores in the particles is reduced.

Conventional aluminosilicates do not easily disperse in the rubber composition even when a coupling agent for improving the dispersibility is used, because aggregation of the particles occurs strongly during the dispersion in the rubber composition. However, the aluminosilicate particles satisfying the above-mentioned characteristics can achieve excellent dispersibility similar to that of silica, while improving the reinforcing effect and reducing the rolling resistance.

According to the present disclosure, the aluminosilicate particles contained in the reinforcing material for rubber are amorphous.

In particular, the amorphous aluminosilicate particles according to the embodiment of the present disclosure are characterized in that a full width at half maximum (FWHM) in a 2θ range of 23° to 37° in a data plot obtained by X-ray diffraction (XRD) satisfies 5° to 7°, which can exhibit excellent physical properties as a reinforcing material for rubber.

Preferably, the FWHM is 5.0° or more, 5.5° or more, or 6.0° or more. In addition, preferably, the FWHM is 7.0° or less, or 6.5° or less.

More preferably, the FWHM is 5° to 7°, 5.5° to 7°, 5.5° to 6.5°, or 6.0° to 6.5°.

The full width at half maximum (FWHM) is a numerical value of a peak width at half of the maximum peak intensity in the 2θ range of 23° to 37° obtained by X-ray diffraction of the aluminosilicate particles.

The unit of the full width at half maximum (FWHM) can be expressed in degrees (°) which is the unit of 2θ. Compounds having high crystallinity may have a small FWHM value.

In addition, the amorphous aluminosilicate particles according to the embodiment of the present disclosure are characterized in that a maximum peak intensity ($I_{max}$) is in a 2θ range of 23° or more and less than 26° in a data plot obtained by X-ray diffraction (XRD), which can exhibit excellent physical properties as a reinforcing material for rubber.

Preferably, the maximum peak intensity ($I_{max}$) is in a 2θ range of 23.0° or more, 23.5° or more, 24.0° or more, or 24.5° or more. In addition, preferably, the maximum peak intensity ($I_{max}$) is in a 2θ range of less than 26.0°, 25.9° or less, or 25.8° or less.

More preferably, the maximum peak intensity ($I_{max}$) is in a 2θ range of 23° or more and less than 26°, 23.5° to 25.9°, 24.0° to 25.9°, or 24.5° to 25.8°.

For reference, amorphous silica shows $I_{max}$ in a 2θ range of 20° to 25° and amorphous alumina shows $I_{max}$ in a 2θ range of 30° to 40°.

Meanwhile, the aluminosilicate particles have a composition of the following Chemical Formula 1:

[Chemical Formula 1]

in Chemical Formula 1,
M is an element selected from the group consisting of Li, Na, K, Rb, Cs, Be, Fr, Ca, Zn, and Mg, or an ion thereof;
a≧0, x>0, y>0, and m≧0;
a/x<1.2; and
3.0<y/x<20.0.

The aluminosilicate particles contain a metal element (M) or an ion thereof, or an alkali metal or an ion thereof, and in particular, satisfy a composition of 3.0<y/x<20.0 and a/x<1.2.

Specifically, in Chemical Formula 1, y/x is more than 3.0, 3.1 or more, 3.2 or more, 3.3 or more, 3.5 or more, or 4.0 or more, and less than 20.0, 15.0 or less, 10.0 or less, 5.0 or less, 4.5 or less, 4.4 or less, 4.3 or less, or 4.2 or less, which may be advantageous for manifesting all of the properties according to the present disclosure.

Preferably, y/x is more than 3.0 and less than 20.0, 3.1 to 10.0, 3.2 to 5.0, 3.3 to 4.5, 3.5 to 4.2, or 4.0 to 4.2.

Specifically, in Chemical Formula 1, a/x is less than 1.2, 1.0 or less, 0.9 or less, 0.8 or less, or 0.7 or less, and 0.01 or more, 0.02 or more, 0.03 or more, 0.04 or more, 0.05 or more, 0.1 or more, 0.2 or more, 0.3 or more, or 0.5 or more, which may be advantageous for manifesting all of the properties according to the present disclosure.

Preferably, a/x is 0.01 to 1.0, 0.01 to 0.9, 0.05 to 0.9, 0.1 to 0.8, 0.3 to 0.8, or 0.5 to 0.7.

According to the embodiment of the present disclosure, the aluminosilicate particles are characterized in that a Brunauer-Emmett-Teller surface area ($S_{BET}$) is 110 to 260 m²/g, and an external specific surface area ($S_{EXT}$) is 90 to 220 m²/g according to an analysis of nitrogen adsorption/desorption.

Specifically, the $S_{BET}$ is 110 m²/g or more, or 115 m²/g or more, and 260 m²/g or less, 250 m²/g or less, or 245 m²/g or less. Preferably, the $S_{BET}$ is 110 to 260 m²/g, 115 to 260 m²/g, 115 to 250 m²/g, or 115 to 245 m²/g.

In addition, the $S_{EXT}$ is 90 m²/g or more, or 95 m²/g or more, and 220 m²/g or less, 210 m²/g or less, 200 m²/g or less, or 195 m²/g or less. Preferably, the $S_{EXT}$ is 90 to 220 m²/g, 90 to 210 m²/g, 90 to 200 m²/g, 90 to 195 m²/g, or 95 to 195 m²/g.

Further, the ratio of $S_{BET}$ to $S_{EXT}$ ($S_{EXT}/S_{BET}$) of the aluminosilicate particles is 0.65 to 0.95, which may be advantageous for manifesting all the properties according to the present disclosure.

Specifically, the ratio of $S_{BET}$ to $S_{EXT}$ ($S_{EXT}/S_{BET}$) is 0.65 or more, 0.70 or more, or 0.75 or more, and 0.95 or less, 0.93 or less, 0.92 or less, or 0.91 or less.

Preferably, the ratio of $S_{BET}$ to $S_{EXT}$ ($S_{EXT}/S_{BET}$) is 0.65 to 0.95, 0.70 to 0.93, 0.75 to 0.92, or 0.75 to 0.91.

It is preferable that the content of micropores in the inorganic material used as the reinforcing material for rubber is minimized. This is because the micropores act as defects and can deteriorate the physical properties of the reinforcing material for rubber.

According to an embodiment of the present disclosure, the aluminosilicate micro are particles are characterized in that a volume of micropores ($V_{micro}$) having a pore size of less than 2 nm calculated from the $S_{BET}$ by a t-plot method is less than 0.05 cm³/g, which can exhibit excellent mechanical properties as a reinforcing material for rubber.

Specifically, the $V_{micro}$ is less than 0.05 cm³/g, 0.025 cm³/g or less, or 0.020 cm³/g or less, and 0.001 cm³/g or more, 0.002 cm³/g or more, 0.003 cm³/g or more, 0.004 cm³/g or more, 0.005 cm³/g or more, or 0.006 cm³/g or more.

Preferably, the $V_{micro}$ is 0.001 to 0.025 cm³/g, 0.003 to 0.020 cm³/g, 0.005 to 0.020 cm³/g, or 0.006 to 0.020 cm³/g.

According to an embodiment of the present disclosure, the aluminosilicate particles have an average primary particle diameter of 10 to 50 nm.

Specifically, the aluminosilicate particles may have an average primary particle diameter of 10 nm or more, 15 nm or more, or 20 nm or more, and 50 nm or less, 45 nm or less, 40 nm or less, or 35 nm or less.

In general, the smaller the particle diameter of the reinforcing material for rubber, the better the reinforcing effect. However, the smaller the particle diameter, the more easily the agglomeration phenomenon occurs between the particles in the rubber composition. If such agglomeration becomes severe, phase separation may occur between the reinforcing material for rubber and the rubber components, resulting in a decrease in processability of tires and a difficulty in achieving the desired reinforcing effect.

Meanwhile, secondary particles, that is, agglomerates of the aluminosilicate particles, may have a particle size distribution which shows a volume average particle diameter ($D_{mean}$) of 1 to 25 μm, a geometric standard deviation of 1 to 20 μm, and a 90% cumulative particle diameter ($D_{90}$) of 1 to 50 μm, when measured under distilled water using a particle size analyzer (PSA).

Specifically, the secondary particles of the aluminosilicate particles may have a volume average particle diameter ($D_{mean}$) of 1 μm or more, 2.5 μm or more, 5 μm or more, 7.5 μm or more, or 10.0 μm or more, and 25.0 μm or less, 22.5 μm or less, 20.0 μm or less, or 19.5 μm or less, when measured using distilled water.

Preferably, the secondary particles of the aluminosilicate particles may have a volume average particle diameter ($D_{mean}$) of 1 to 25 μm, 5 to 22.5 μm, 7.5 to 20 μm, or 10 to 19.5 μm, when measured using distilled water.

Further, the secondary particles of the aluminosilicate particles may have a geometric standard deviation of 1.0 μm or more, 2.5 μm or more, 5.0 μm or more, or 7.0 μm or more, and 20 μm or less, 15 μm or less, or 10 μm or less, when measured using distilled water.

Preferably, the secondary particles of the aluminosilicate particles may have a geometric standard deviation of 1 to 20 μm, 5 to 15 μm, or 7 to 10 μm.

The secondary particles of the aluminosilicate particles may have a 90% cumulative particle diameter ($D_{90}$) of 1 μm or more, 5 μm or more, 10 μm or more, 15 μm or more, 20 μm or more, or 25 μm or more, and 50 μm or less, 40 μm or less, or 35 μm or less, when measured using distilled water.

Preferably, the secondary particles of the aluminosilicate particles may have a 90% cumulative particle diameter ($D_{90}$) of 1 to 50 μm, 10 to 40 μm, 20 to 35 μm, or 25 to 35 μm.

The aluminosilicate particles satisfying all of the above characteristics may be prepared by a method including the steps of:

[i] adding silicon sources, aluminum sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at a low temperature (for example, from room temperature to 90° C.) and atmospheric pressure for 3 to 24 hours to cause an Al—O—Si polymerization reaction;

[iii] washing and drying the polymerized aluminosilicate particles; and [iv] crushing the dried aluminosilicate particles to control particle size distribution.

The aluminosilicate particles satisfying all of the above characteristics can be obtained by controlling the type of reactants, the molar ratio of reactants, and the reaction conditions to be applied to the formation of the monomer unit in the method.

Preferably, the aluminosilicate particles satisfying all of the above characteristics may be prepared by a method including the steps of: (a) preparing a reaction solution of a pH of 6 to 10 containing an aluminosilicate salt by neutralizing an alkaline silicon source and an acidic aluminum source at a temperature of more than 70° C. and 95° C. or less; (b) washing the aluminosilicate salt to obtain aluminosilicate particles; and (c) drying the aluminosilicate particles.

In particular, this method can provide aluminosilicate particles having improved workability and productivity in a rubber molding process while exhibiting excellent dispersibility in a rubber composition by performing the neutralization reaction at a temperature of more than 70° C. and 95° C. or less so that the reaction solution thus prepared has a pH of 6 to 10.

The aluminosilicate particles provided by the above method can be suitably applied as a reinforcing material for rubber when added to a rubber composition for tires.

In the above method, the silicon source is an alkaline solution with a pH of more than 7 including a water-soluble silicone salt.

As the water-soluble silicone salt, a silicone compound capable of exhibiting alkalinity with a pH of more than 7 in an aqueous solution can be used without particular limitation. Preferably, the water-soluble silicone salt may be at least one compound selected from the group consisting of sodium silicate ($Na_2SiO_3$) and potassium silicate ($K_2SiO_3$).

In the above method, the aluminum source is an acidic solution with a pH of less than 7 including a water-soluble aluminum salt.

Preferably, the water-soluble aluminum salt may be at least one compound selected from the group consisting of aluminum chloride ($AlCl_3$), aluminum nitrate ($Al(NO_3)_3$), aluminum monoacetate (($HO)_2AlCH_3CO_2$), aluminum diacetate ($HOAl(CH_3CO_2)_2$), aluminum triacetate ($Al(CH_3CO_2)_3$), aluminum sulfate ($Al_2(SO_4)_3$), and aluminum potassium sulfate ($AlK(SO_4)_2$). More preferably, the use of aluminum nitrate, aluminum potassium sulfate, or a mixture thereof as the water-soluble aluminum salt may be advantageous in that agglomeration of particles can be minimized during the recovery of the aluminosilicate particles.

The neutralization reaction is carried out by mixing the alkaline silicon source with the acidic aluminum source to obtain a reaction solution containing an aluminosilicate salt as a solid component.

In particular, it is preferable that the neutralization reaction is performed at a temperature of more than 70° C. and 95° C. or less.

Specifically, the neutralization reaction may be performed at a temperature of more than 70° C., 75° C. or more, or 80° C. or more, and 95° C. or less, 90° C. or less, or 85° C. or less. More preferably, the reaction may be performed at a temperature of 75° C. to 90° C.

When the temperature is too low, inorganic components including the silicon source and the aluminum source are aggregated during the neutralization reaction, so that it is difficult for the reaction to proceed uniformly. Accordingly, it becomes difficult to control the particle size of the aluminosilicate particles finally obtained after the neutralization reaction, and the particles are tightly aggregated to form gigantic secondary particles. As a result, particles having the desired rubber reinforcing effect cannot be obtained. Therefore, it is preferable that the neutralization reaction is performed at a temperature of more than 70° C.

However, when the temperature is too high, the reaction efficiency may be lowered due to boiling of the solvent. Therefore, it is preferable that the neutralization reaction is performed at a temperature of 95° C. or less.

A mixing ratio of the silicon source and the aluminum source in the neutralization reaction may be determined in consideration of the kind of salt contained in each source, the pH of each source, and the preferable pH range of the reaction solution which is a product of the neutralization reaction.

In particular, according to an embodiment of the present disclosure, it is preferable that the reaction solution, which is a product of the neutralization reaction, has a concentration of hydrogen ions which may obtain a pH of 6 or more, a pH of 6 to 10, or a pH of 6 to 8.

If the concentration of hydrogen ions of the reaction solution is such that a pH of less than 6 is obtained, the particle size of the aluminosilicate particles becomes difficult to control, and the size of the particles generally increases, so that the desired rubber reinforcing effect may not be achieved.

Furthermore, the pH of the reaction solution affects a pH of the aluminosilicate particles finally obtained. In addition, the pH of the aluminosilicate particles affects scorch time in a process of compounding the particles into the rubber composition. The scorch time refers to a period of time before vulcanization of a rubber composition starts in a rubber molding process. Generally, after the vulcanization of the rubber composition starts, a flow of the rubber composition in the mold is stopped and molding such as pressing becomes difficult, so an appropriate scorch time is required for ensuring workability and productivity.

However, if the pH of the aluminosilicate particles is too low or too high, it becomes difficult to secure the appropriate scorch time in the rubber molding process. Therefore, workability and productivity of the rubber molding may be deteriorated, since adding a separate vulcanization retarder or additional processing to prevent scorching is required.

For example, if the pH of the aluminosilicate particles is too low, the scorch time during the rubber compounding may be sharply slowed, and if the pH is too high, the scorch time may be drastically accelerated.

Specifically, the pH of the particles greatly affects reactivity of the components to be mixed together in the rubber compounding process, and in particular, accelerates or decelerates the rate at which amine-type functional groups react.

That is, when the pH of the particles is low, the reactivity of the amine group is lowered, and when the pH of the particles is high, the reactivity of the amine group is promoted. If the reactivity is excessively accelerated during the rubber compounding process, there is a problem in product molding, and if the reactivity is too low, productivity may be lowered.

Therefore, in order to ensure the appropriate scorch time in the rubber molding process in which the aluminosilicate particles are applied as a reinforcing material for rubber, the neutralization reaction is preferably performed so that the reaction solution containing an aluminosilicate salt has a concentration of hydrogen ions which may obtain a pH of 6 to 10.

In the washing step, the solid aluminosilicate salt is recovered from the reaction solution obtained by the neutralization reaction, and dispersed in water such as distilled water or deionized water, followed by washing several times to obtain aluminosilicate particles.

Subsequently, a step of drying the aluminosilicate particles is performed. The drying step may be carried out at a temperature of 20 to 150° C. for 1 to 48 hours.

If necessary, conventional steps such as pulverizing and classifying the obtained aluminosilicate particles can be further performed.

II. Rubber Composition for Tires

According to another embodiment of the present disclosure, a rubber composition for tires including the aluminosilicate particles as a reinforcing material for rubber is provided.

The aluminosilicate particles prepared by the above-mentioned method may have enhanced processability and productivity while exhibiting an improved reinforcing effect due to excellent dispersibility in the rubber composition.

In addition, the aluminosilicate particles may exhibit excellent mechanical properties (for example, excellent durability, abrasion resistance, compressive strength, etc.) as compared with reinforcing materials for rubber not satisfying the above-mentioned characteristics, since the formation of micropores in the particles is reduced.

The rubber composition for tires may include a general diene elastomer without any particular limitation.

For example, the diene elastomer may be at least one compound selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

The rubber composition for tires may also include a coupling agent which provides chemical and/or physical bonding between the aluminosilicate particles and the diene elastomer. As the coupling agent, conventional components such as a polysiloxane-based compound may be included without particular limitation.

In addition, plasticizers, pigments, antioxidants, ozone deterioration inhibitors, vulcanization accelerators, and the like which are commonly used in the tire industry may be added to the rubber composition for tires.

The aluminosilicate particles included in the reinforcing material for rubber according to the present disclosure can exhibit an enhanced reinforcing effect due to excellent dispersibility in the rubber composition, but do not hinder processability of the rubber composition. Therefore, the aluminosilicate particles can be suitably applied as a reinforcing material for rubber used in a rubber composition for tires.

EXAMPLES

Hereinafter, preferred examples are provided for better understanding. However, these examples are for illustrative purposes only, and the invention is not intended to be limited by these examples.

Example 1

A 0.005 M sodium silicate ($Na_2SiO_3$) aqueous solution and a 0.005 M aluminum nitrate ($Al(NO_3)_3$) aqueous solution were mixed at 80° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Example 2

A 0.005 M sodium silicate ($Na_2SiO_3$) aqueous solution and a 0.005 M aluminum potassium sulfate ($AlK(SO_4)_2$) aqueous solution were mixed at 80° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Example 3

A 0.005 M sodium silicate ($Na_2SiO_3$) aqueous solution and a 0.005 M aluminum nitrate ($Al(NO_3)_3$) aqueous solution were mixed at 75° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Example 4

A 0.005 M sodium silicate ($Na_2SiO_3$) aqueous solution and a 0.005 M aluminum nitrate ($Al(NO_3)_3$) aqueous solution were mixed at 85° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Example 5

A 0.005 M sodium silicate ($Na_2SiO_3$) aqueous solution and a 0.005 M aluminum nitrate ($Al(NO_3)_3$) aqueous solution were mixed at 90° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Comparative Example 1

23 g of KOH (Daejung Chemicals & Metals) and 27 g of colloidal silica (Ludox HS 30 wt %; Sigma-Aldrich) were completely dissolved in 62 ml of distilled water. 15 g of metakaolin ($Al_2Si_2O_7$, Aldrich) was added thereto, followed by stirring at 800 rpm for 40 minutes using an overhead stirrer.

This was cured at 70° C. for 4 hours.

The cured solid product was added to distilled water at 90° C., and then washed to about pH 7 by stirring and centrifugation for 12 hours.

The washed solid product was dispersed in distilled water to form a colloidal solution, followed by centrifugation at 1500 rpm for 5 minutes to precipitate unreacted sources. From this, a supernatant in which aluminosilicate particles were dispersed was obtained and the precipitated unreacted sources were discarded.

The supernatant in which aluminosilicate particles were dispersed was dried in an oven at 70° C. for 24 hours to finally obtain aluminosilicate particles.

Comparative Example 1 is a method of synthesizing aluminosilicate by using metakaolin under an aqueous solution atmosphere of a strong base (pH 14). The synthesis process is complicated compared with the examples, and a high cost is required in forming the strong base atmosphere.

Comparative Example 2

A 0.005 M sodium silicate ($Na_2SiO_3$) aqueous solution and a 0.005 M aluminum nitrate ($Al(NO_3)_3$) aqueous solution were mixed at 30° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Comparative Example 3

A 0.005 M sodium silicate ($Na_2SiO_3$) aqueous solution and a 0.005 M aluminum nitrate ($Al(NO_3)_3$) aqueous solution were mixed at 70° C. to a pH of 6.2, and then neutralized by mixing at 500 rpm for 10 minutes using an overhead stirrer. A reaction solution (pH 6.2) containing an aluminosilicate salt was obtained by the neutralization reaction.

The aluminosilicate salt was added to distilled water at room temperature, and then washed by stirring and centrifugation for 12 hours.

The washed aluminosilicate salt was dried in an oven at 70° C. for 24 hours to finally obtain aluminosilicate particles.

Comparative Example 4

Silica particles (ULTRASIL® 7000 GR) manufactured by Evonik Industries were prepared.

Preparation Example 1

137 g of a diene elastomer mixture (SSBR 2550, LG Chem), 70 g of the aluminosilicate particles according to Example 1 as a reinforcing material, and 11.2 g of a silane coupling agent (polysiloxane-based) were added to a closed mixer. This was mixed at 150° C. for 5 minutes, and then mixed with sulfur and a vulcanization accelerator for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

Preparation Example 2

A rubber composition and a molded product were obtained in the same manner as in Preparation Example 1, except that the aluminosilicate particles according to Example 2 were added instead of the aluminosilicate particles of Example 1 as a reinforcing material.

Preparation Example 3

A rubber composition and a molded product were obtained in the same manner as in Preparation Example 1, except that the aluminosilicate particles according to Example 3 were added instead of the aluminosilicate particles of Example 1 as a reinforcing material.

Preparation Example 4

A rubber composition and a molded product were obtained in the same manner as in Preparation Example 1, except that the aluminosilicate particles according to Example 4 were added instead of the aluminosilicate particles of Example 1 as a reinforcing material.

Preparation Example 5

A rubber composition and a molded product were obtained in the same manner as in Preparation Example 1, except that the aluminosilicate particles according to Example 5 were added instead of the aluminosilicate particles of Example 1 as a reinforcing material.

Preparation Example 6

A rubber composition and a molded product were obtained in the same manner as in Preparation Example 1, except that the aluminosilicate particles according to Comparative Example 1 were added instead of the aluminosilicate particles of Example 1 as a reinforcing material.

Preparation Example 7

A rubber composition and a molded product were obtained in the same manner as in Preparation Example 1, except that the aluminosilicate particles according to Comparative Example 2 were added instead of the aluminosilicate particles of Example 1 as a reinforcing material.

Preparation Example 8

A rubber composition and a molded product were obtained in the same manner as in Preparation Example 1, except that the aluminosilicate particles according to Comparative Example 3 were added instead of the aluminosilicate particles of Example 1 as a reinforcing material.

Preparation Example 9

A rubber composition and a molded product were obtained in the same manner as in Preparation Example 1, except that the aluminosilicate particles according to Comparative Example 4 were added instead of the aluminosilicate particles of Example 1 as a reinforcing material.

Experimental Example 1

X-ray fluorescence (XRF, Rigaku ZSX Primus II spectrometer, wavelength dispersive type) was used to confirm a composition of the particles according to the examples and comparative examples. The XRF measurement was performed using an Rh target and measuring the particle powder mounted on a holder having a diameter of 30 mm.

TABLE 1

| Composition (Chemical Formula 1) | M | a/x | y/x |
|---|---|---|---|
| Example 1 | Na | 0.55 | 4.045 |
| Example 2 | Na | 0.61 | 4.102 |
| Example 3 | Na | 0.58 | 4.079 |
| Example 4 | Na | 0.57 | 4.033 |
| Example 5 | Na | 0.55 | 4.080 |
| Comp. Example 1 | K | 1.06 | 1.592 |
| Comp. Example 2 | Na | 0.54 | 4.005 |
| Comp. Example 3 | Na | 0.54 | 4.114 |
| Comp. Example 4 | — | — | — |

Referring to Table 1, it was confirmed that the aluminosilicate particles of Comparative Example 1 had a y/x value not satisfying the preferable range.

Experimental Example 2

X-ray diffraction analysis for each of the aluminosilicate particles according to the examples and comparative examples was carried out using an X-ray diffractometer (Bruker AXS D4-Endeavor XRD) under an applied voltage of 40 kV and an applied current of 40 mA.

The measured range of 2θ was 10° to 90°, and it was scanned at an interval of 0.05°. Herein, a variable divergence slit of 6 mm was used as a slit, and a large PMMA holder (diameter=20 mm) was used to eliminate background noise due to the PMMA holder.

A full width at half maximum (FWHM) at a peak of about 29° which is the maximum peak in the 2θ range of 20° to 37° was calculated in the data plot obtained by X-ray diffraction (XRD).

TABLE 2

| | FWHM (°) | $I_{max}$ (°) | Crystal form |
|---|---|---|---|
| Example 1 | 6.2 | 25.0 | Amorphous |
| Example 2 | 6.3 | 25.8 | Amorphous |
| Example 3 | 6.2 | 25.1 | Amorphous |
| Example 4 | 6.2 | 25.0 | Amorphous |
| Example 5 | 6.1 | 25.1 | Amorphous |

TABLE 2-continued

| | FWHM (°) | $I_{max}$ (°) | Crystal form |
|---|---|---|---|
| Comp. Example 1 | 5.8 | 29.2 | Amorphous |
| Comp. Example 2 | 6.2 | 25.1 | Amorphous |
| Comp. Example 3 | 6.0 | 25.0 | Amorphous |
| Comp. Example 4 | 5.2 | 22.5 | Amorphous |

Experimental Example 3

(1) An average primary particle diameter of the particles according to the examples and comparative examples was measured using scanning electron microscopy (SEM).

In the measurement of the average primary particle diameter, the particle diameter means a Feret diameter and was calculated as an average of values obtained by measuring the particle diameters in various directions. Specifically, after obtaining a SEM image in which more than 100 particles were observed, a random straight line was plotted, and the primary particle diameter of the particles was calculated using the length of the straight line, the number of particles included on the straight line, and the magnification. The average primary particle diameter was determined by setting 20 or more of these straight lines.

(2) A nitrogen adsorption/desorption Brunauer-Emmett-Teller surface area ($S_{BET}$) and an external specific surface area ($S_{EXT}$) excluding micropores having a pore size of less than 2 nm were measured for each of the particles according to the examples and comparative examples using a specific surface area analyzer (BEL Japan Inc., BELSORP-MAX). Then, a volume of micropores ($V_{micro}$) having a pore size of less than 2 nm was calculated from the $S_{BET}$ by a t-plot method.

In this measurement, the particles were pretreated by heating at 250° C. for 4 hours, and a temperature of an air oven mounted in the analyzer was maintained at 40° C.

TABLE 3

| | Average primary particle diameter (nm) | $S_{BET}$ ($m^2/g$) | $S_{EXT}$ ($m^2/g$) | $S_{EXT}/S_{BET}$ | $V_{micro}$ ($cm^3/g$) |
|---|---|---|---|---|---|
| Example 1 | 19.6 | 187.33 | 169.11 | 0.902 | 0.006 |
| Example 2 | 20.7 | 207.54 | 170.59 | 0.822 | 0.012 |
| Example 3 | 17.5 | 241.25 | 190.47 | 0.790 | 0.016 |
| Example 4 | 23.4 | 154.78 | 129.61 | 0.889 | 0.008 |
| Example 5 | 29.7 | 115.47 | 95.72 | 0.829 | 0.012 |
| Comp. Example 1 | 28.4 | 112.66 | 97.82 | 0.873 | 0.006 |
| Comp. Example 2 | 2216.0 | 32.4 | 29.3 | 0.904 | 0.006 |
| Comp. Example 3 | 15.9 | 287.39 | 231.58 | 0.806 | 0.014 |
| Comp. Example 4 | 22.3 | 171.50 | 151.60 | 0.884 | 0.009 |

Referring to Table 3, it was confirmed that the examples can provide aluminosilicate particles having an average primary particle diameter of about 20 nm and excellent specific surface area without formation of aggregates.

Experimental Example 4

0.1 g of the particles according to the examples and comparative examples were added to 10 ml of distilled water to prepare a solution containing 1 wt % of the particles. The solution was sonicated for 5 minutes at 90% power in a 100 W pulsed ultrasonication device. Herein, the energy by the sonication acts as physical energy similar to mechanical force applied to the composition when the rubber composition is blended, so that a size distribution of the aggregates dispersed in the rubber composition can be indirectly confirmed.

The dispersed solution was subjected to sonication for an additional 2 minutes using a particle size analyzer (manufactured by HORIBA, model LA-960, laser diffraction type), and then a size distribution, a volume average particle diameter ($D_{mean}$, μm), a geometric standard deviation (std. dev., μm), and a cumulative particle diameter ($D_{10}$, $D_{50}$, $D_{90}$, μm) of a volume distribution were measured for the aggregates of the above particles.

TABLE 4

| (μm) | $D_{mean}$ | Std. Dev. | $D_{10}$ | $D_{50}$ | $D_{90}$ |
|---|---|---|---|---|---|
| Example 1 | 16.8 | 7.5 | 9.1 | 14.7 | 28.1 |
| Example 2 | 14.9 | 7.2 | 8.5 | 14.6 | 27.2 |
| Example 3 | 16.1 | 8.1 | 8.3 | 15.7 | 26.9 |
| Example 4 | 17.5 | 7.8 | 8.9 | 17.1 | 28.8 |
| Example 5 | 19.2 | 8.5 | 9.5 | 18.4 | 30.2 |
| Comp. Example 1 | 18.3 | 15.0 | 7.9 | 11.0 | 45.2 |
| Comp. Example 2 | 269.2 | 201.3 | 18.5 | 209.6 | 843.9 |
| Comp. Example 3 | 88.4 | 57.3 | 14.1 | 80.3 | 447.6 |
| Comp. Example 4 | 20.6 | 14.1 | 11.2 | 20.1 | 45.1 |

Referring to Table 4, it was confirmed that the secondary particles of the aluminosilicate particles according to the examples exhibited a particle size distribution within a suitable range for use as a reinforcing material for rubber.

Experimental Example 5

The dynamic loss factor (tan δ) of the rubber molded products according to the preparation examples was measured under a dynamic strain of 3% and a static strain of 3% using a viscoelasticity measurement apparatus (DMTS 500N, Gabo, Germany). The measured values were normalized based on the value of the rubber molded product of Preparation Example 9, and are shown together.

For reference, the dynamic loss factor at 0° C. (tan δ@0° C.) is related to a wet grip property of tires. It is known that the higher the absolute value, the better the wet grip property. In addition, the dynamic loss factor at 60° C. (tan δ@60° C.) is related to rolling resistance of tires, and it is known that the lower the absolute value, the better the rolling resistance.

TABLE 5

| | Reinforcing material for rubber | tanδ @ 0° C. | tanδ @ 0° C. (index) | tanδ @ 60° C. | tanδ @ 60° C. (index) |
|---|---|---|---|---|---|
| Prep. Ex. 1 | Ex. 1 | 0.781 | 107 | 0.112 | 123 |
| Prep. Ex. 2 | Ex. 2 | 0.792 | 109 | 0.109 | 125 |
| Prep. Ex. 3 | Ex. 3 | 0.881 | 112 | 0.113 | 119 |
| Prep. Ex. 4 | Ex. 4 | 0.804 | 111 | 0.110 | 124 |
| Prep. Ex. 5 | Ex. 5 | 0.835 | 115 | 0.101 | 130 |
| Prep. Ex. 6 | Comp. Ex. 1 | 0.792 | 109 | 0.123 | 115 |
| Prep. Ex. 7 | Comp. Ex. 2 | — | — | — | — |
| Prep. Ex. 8 | Comp. Ex. 3 | — | — | — | — |
| Prep. Ex. 9 | Comp. Ex. 4 | 0.727 | 100 | 0.145 | 100 |

Referring to Table 5, it was confirmed that the rubber molded products according to Preparation Examples 1 to 5 exhibit better rolling resistance and wet grip property than those of the rubber molded products according to Preparation Examples 6 and 9.

In Preparation Examples 7 and 8, it was not possible to obtain rubber molded products (sheets), so that the physical properties thereof could not be measured.

Experimental Example 6

The abrasion resistance index was calculated and the abrasion resistance was evaluated by measuring mass loss and specific gravity of the test material and the reference material according to DIN ISO 4649 using an abrasion tester (Bareiss GmbH) for the rubber molded products according to the preparation examples.

The abrasion resistance index was calculated by {[(loss weight of reference material)×(specific gravity of reference material)]/[(loss weight of test material)×(specific gravity of test material)]}×100 (reference material: neutral rubber).

TABLE 6

| Rubber molded product | Reinforcing material for rubber | Abrasion resistance index (%) |
| --- | --- | --- |
| Prep. Ex. 1 | Ex. 1 | 114.0 |
| Prep. Ex. 2 | Ex. 2 | 120.0 |
| Prep. Ex. 3 | Ex. 3 | 117.4 |
| Prep. Ex. 4 | Ex. 4 | 109.5 |
| Prep. Ex. 5 | Ex. 5 | 104.7 |
| Prep. Ex. 6 | Comp. Ex. 1 | 98.0 |
| Prep. Ex. 7 | Comp. Ex. 2 | — |
| Prep. Ex. 8 | Comp. Ex. 3 | — |
| Prep. Ex. 9 | Comp. Ex. 4 | 120.5 |

Referring to Table 6, it was confirmed that the rubber molded products according to Preparation Examples 1 to 5 exhibited remarkably excellent abrasion resistance as compared with the rubber molded product of Preparation Example 6.

Referring to Tables 5 and 6, the rubber molded product of Preparation Example 6 showed excellent rolling resistance and wet grip properties as compared with the rubber molded product of Preparation Example 9, but it was confirmed to have remarkably low abrasion resistance.

ABSTRACT

The present disclosure relates to a reinforcing material for rubber including aluminosilicate particles and a rubber composition for tires including the same. The aluminosilicate particles included in the reinforcing material for rubber according to the present disclosure exhibit an enhanced reinforcing effect due to excellent dispersibility in the rubber composition, but do not hinder processability of the rubber composition. Therefore, the aluminosilicate particles can be suitably applied as a reinforcing material in a rubber composition for tires.

The invention claimed is:

1. A reinforcing material for rubber comprising amorphous aluminosilicate particles, wherein the aluminosilicate particles are represented by following Chemical Formula 1:

$$[(M_aAl_xO_{2x}).(Si_yO_{2y})].m(H_2O)$$ [Chemical Formula 1]

wherein, in Chemical Formula 1,
M is an element selected from the group consisting of Li, Na, K, Rb, Cs, Be, Fr, Ca, Zn, and Mg, or an ion thereof;
a≥0, x>0, y>0, and m≥0;
a/x<1.2; and
3.0<y/x<20.0, and
wherein the aluminosilicate particles satisfy the following conditions:
in a data plot obtained by X-ray diffraction (XRD) of the aluminosilicate particles, a full width at half maximum (FWHM) in a 2θ range of 23° to 37° is 5° to 7°, and a maximum peak intensity ($I_{max}$) is in a 2θ range of 23° or more and 25.8° or less, and
wherein a secondary particle size distribution of the aluminosilicate particles has a volume average particle diameter ($D_{mean}$) of 1 to 25 μm, a geometric standard deviation of 1 to 20 μm, and a 90% cumulative particle diameter ($D_{90}$) of 1 to 50 μm, when measured using distilled water.

2. The reinforcing material for rubber of claim 1, wherein the aluminosilicate particles satisfy the following conditions:
a Brunauer-Emmett-Teller surface area ($S_{BET}$) of the aluminosilicate particles is 110 to 260 m²/g, and an external specific surface area ($S_{EXT}$) of the aluminosilicate particles is 90 to 220 m²/g according to an analysis of nitrogen adsorption/desorption, and
wherein a volume of micropores ($V_{micro}$) having a pore size of less than 2 nm calculated from the $S_{BET}$ by a t-plot method is less than 0.05 cm³/g.

3. A rubber composition for tires comprising the reinforcing material for rubber of claim 1.

4. The rubber composition for tires of claim 3, wherein the rubber composition further comprises at least one diene elastomer.

5. The rubber composition for tires of claim 4, wherein the diene elastomer is at least one selected from the group consisting of a natural rubber, polybutadiene, polyisoprene, a butadiene/styrene copolymer, a butadiene/isoprene copolymer, a butadiene/acrylonitrile copolymer, an isoprene/styrene copolymer, and a butadiene/styrene/isoprene copolymer.

6. A reinforcing material for rubber comprising amorphous aluminosilicate particles, wherein the aluminosilicate particles are represented by following Chemical Formula 1:

$$[(M_aAl_xO_{2x}).(Si_yO_{2y})].m(H_2O)$$ [Chemical Formula 1]

wherein, in Chemical Formula 1,
M is an element selected from the group consisting of Li, Na, K, Rb, Cs, Be, Fr, Ca, Zn, and Mg, or an ion thereof;
a≥0, x>0, y>0, and m≥0;
a/x<1.2; and
3.0<y/x<20.0, and
wherein the aluminosilicate particles satisfy the following conditions:
in a data plot obtained by X-ray diffraction (XRD) of the aluminosilicate particles, a full width at half maximum (FWHM) in a 2θ range of 23° to 37° is 5° to 7°, and a maximum peak intensity ($I_{max}$) is in a 2θ range of 23° or more and 25.8° or less,
a Brunauer-Emmett-Teller surface area ($S_{BET}$) of the aluminosilicate particles is 110 to 260 m²/g, and an external specific surface area ($S_{EXT}$) of the aluminosilicate particles is 90 to 220 m²/g according to an analysis of nitrogen adsorption/desorption,
wherein a volume of micropores ($V_{micro}$) having a pore size of less than 2 nm calculated from the $S_{BET}$ by a t-plot method is less than 0.05 cm³/g, and
wherein a secondary particle size distribution of the aluminosilicate parties has a volume average particle diameter ($D_{mean}$) of 1 to 25 μm, a geometric standard deviation of 1 to 20 μm, and a 90% cumulative particle diameter ($D_{90}$) of 1 to 50 μm, when measured using distilled water.

\* \* \* \* \*